United States Patent [19]
Ashton

[11] 4,438,564
[45] * Mar. 27, 1984

[54] EGG SCOOP OR SPOON

[75] Inventor: Harold P. Ashton, Providence, R.I.

[73] Assignee: Dart Industries Inc., Northbrook, Ill.

[*] Notice: The portion of the term of this patent subsequent to Aug. 16, 1994 has been disclaimed.

[21] Appl. No.: 703,718

[22] Filed: Jul. 9, 1976

[51] Int. Cl.³ .............................................. A47J 43/28
[52] U.S. Cl. ...................................... 30/324; 30/325; 30/327
[58] Field of Search ........................ 30/324, 325, 327; D7/104, 138, 140

[56] References Cited

U.S. PATENT DOCUMENTS

| | | | |
|---|---|---|---|
| D. 115,515 | 7/1939 | Greenberg | D7/102 |
| D. 245,385 | 8/1977 | Ashton | D7/104 |
| 1,948,880 | 2/1934 | Hamm | 30/324 X |
| 3,727,306 | 4/1973 | Patik | 30/324 X |

FOREIGN PATENT DOCUMENTS

| | | | |
|---|---|---|---|
| 378936 | 8/1923 | Fed. Rep. of Germany | 30/325 |
| 455286 | 1/1928 | Fed. Rep. of Germany | 30/324 |
| 344600 | 3/1931 | United Kingdom | 30/150 |

*Primary Examiner*—Robert C. Watson
*Assistant Examiner*—J. T. Zatarga
*Attorney, Agent, or Firm*—Leigh B. Taylor

[57] ABSTRACT

An improved egg scoop or spoon suitable for handling hot boiled eggs wherein the spoon bowl is itself egg shaped and is constructed so as to be easily positionable around an egg, to surround and firmly retain an egg and to provide for the drainage of fluids from the egg without its retention within the spoon bowl and the ready floatation of an egg from the spoon bowl when presented to a body of fluid.

3 Claims, 11 Drawing Figures

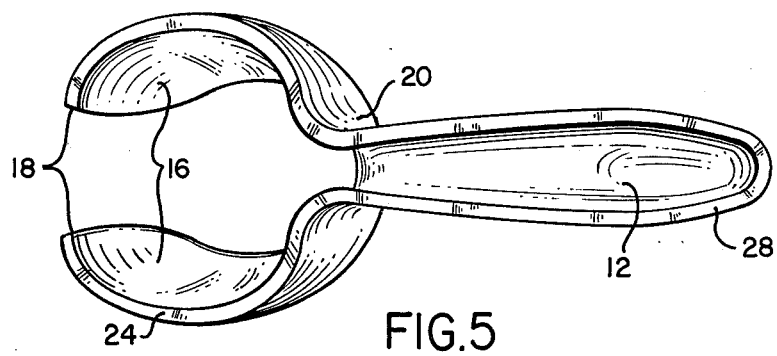
FIG.5
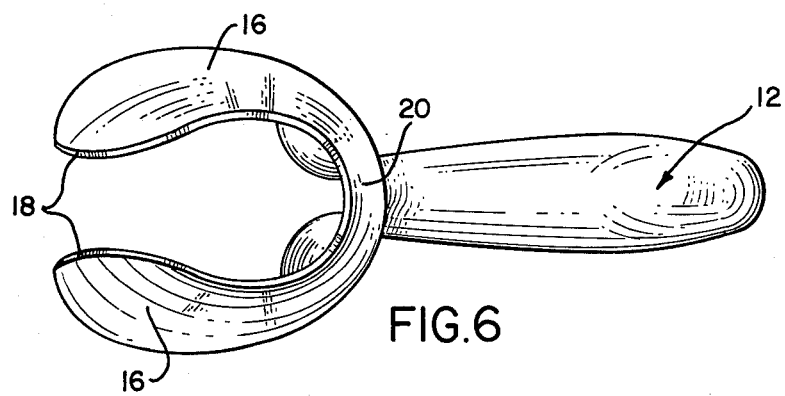
FIG.6
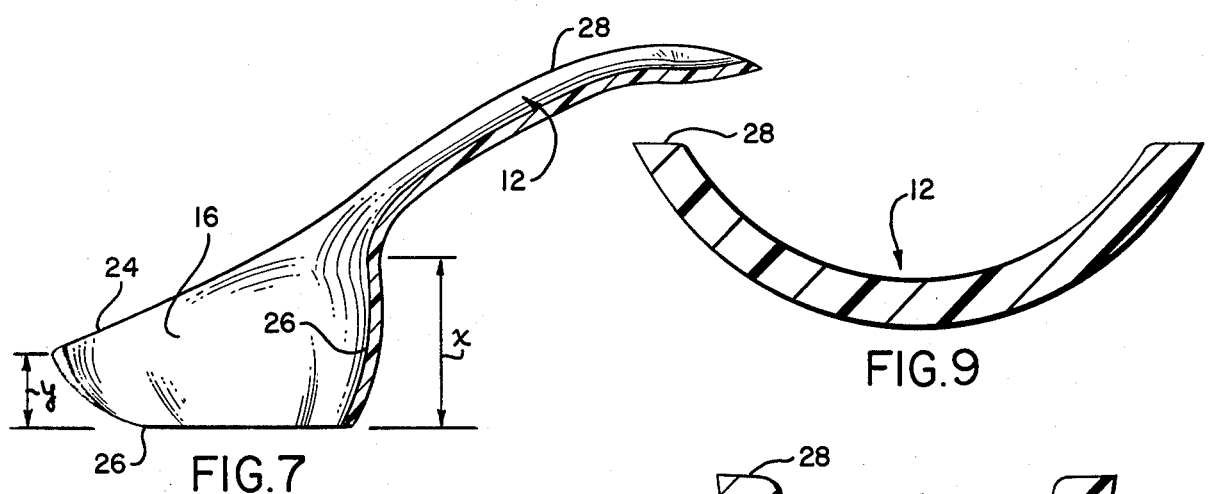
FIG.7
FIG.9
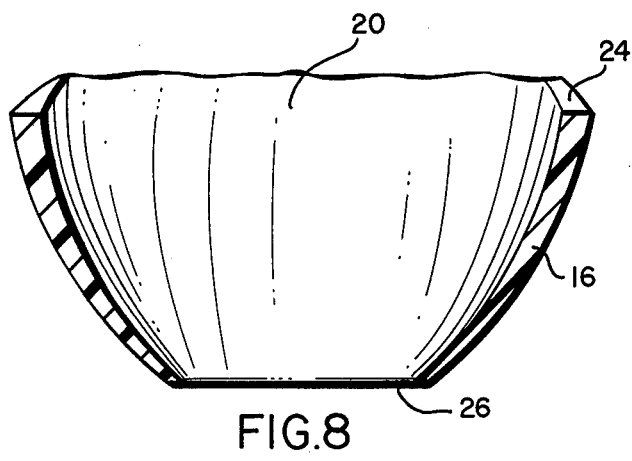
FIG.8
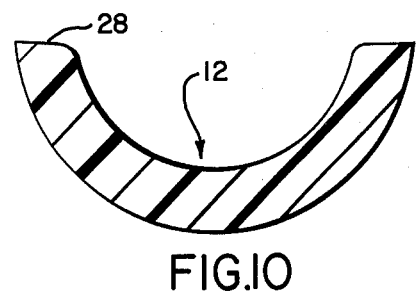
FIG.10
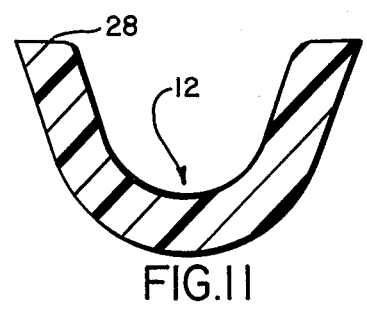
FIG.11

EGG SCOOP OR SPOON

The present invention relates to a spoon and more particularly to an improved boiled egg spoon that is suitably constructed for placing eggs into or removing same from a fluid medium.

Although there are prior art devices adapted for these purposes, it should be noted that same have a variety of deficiencies. For example, most incorporate a bowl construction that simulates a table spoon in size and shape. Similarly, it is common that the general plane of the handle protrusions on these prior art devices approximates or is proximate to the general plane of the bowl. Accordingly, even though these devices include openings within the confines of the bowl to accommodate fluid drainage, it is difficult to secure, balance and retain the egg upon same.

The construction of this egg spoon is such that the prior art disadvantages are overcome because of (1) the drastic handle offset above the retentive portion of the spoon bowl and (2) the bifurcated nature of the bowl fluid is not retained thereon and such is easily positionable around any egg so as to securely retain same. Likewise, in those instances where an egg is to be placed into a fluid medium, it is similarly stably retained until, at the pleasure of the user, it is poured from the sppon.

Furthermore, to fully accommodate the egg, the bowl is of a slight concavity thus approximating an egg shape. Likewise, due to the bifurcation and shallow terminal end construction of the bowl it is an easy matter to dispense from the spoon and into, for example, an egg cup without touching or using other assistants.

These and other advantages will become more apparent upon continuing reference to the appended specification, claims and drawings wherein:

FIG. 5 is a top plan view;

FIG. 6 is a bottom plan view;

FIG. 7 is a cross-sectional view taken along line 7—7 of FIG. 4;

FIG. 8 is a cross-sectional view taken along line 8—8 of FIG. 3; and

Figure 4:
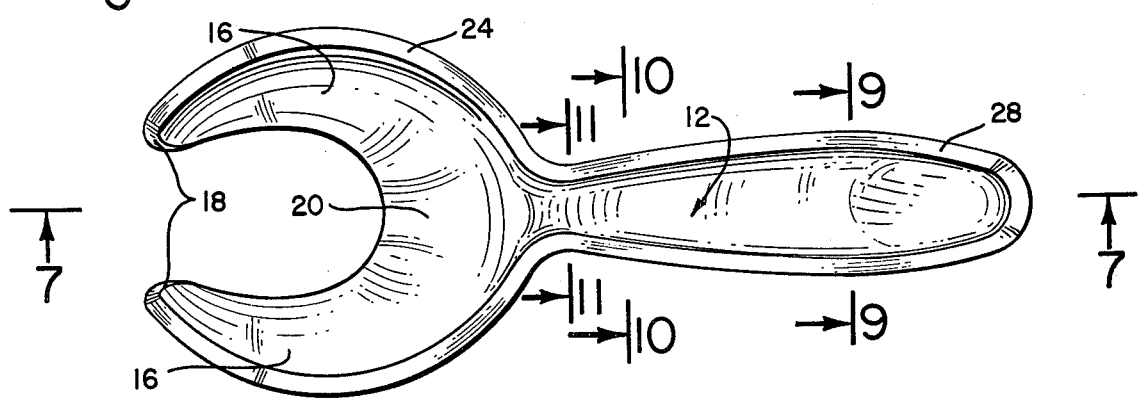
FIG. 4 is a top plan view of the spoon looking from the plane of line 4—4 of FIG. 3.

FIGS. 9, 10 and 11 are cross-sectional views of the spoon handle taken along lines 9—9, 10—10 and 11—11 of FIG. 4.

This egg spoon or scoop 10 is comprised of an integral handle member 12 and bowl 14 which are uniquely arranged and shaped so as to make the placement of eggs within a fluid medium or the retrieval thereof from such medium an easily accomplished task.

Figure 1:
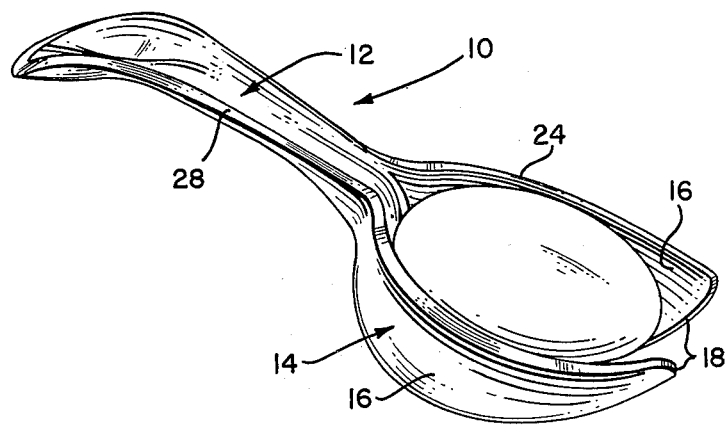
FIG. 1 is a top perspective view of the egg scoop or spoon showing the unique incorporated features and an egg positioned therein.
Figure 2:
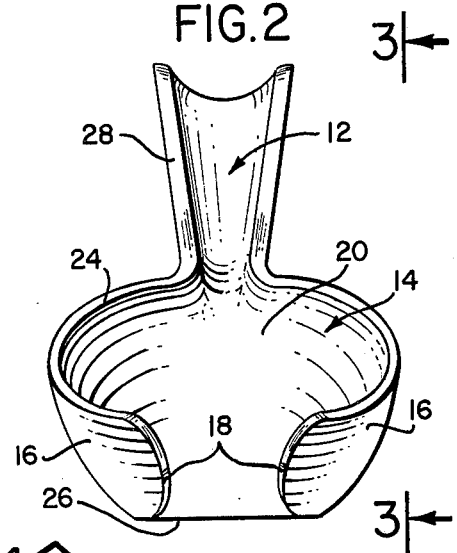
FIG. 2 is a front elevational view thereof clearly showing the bifurcated structure of the spoon bowl.
Figure 3:
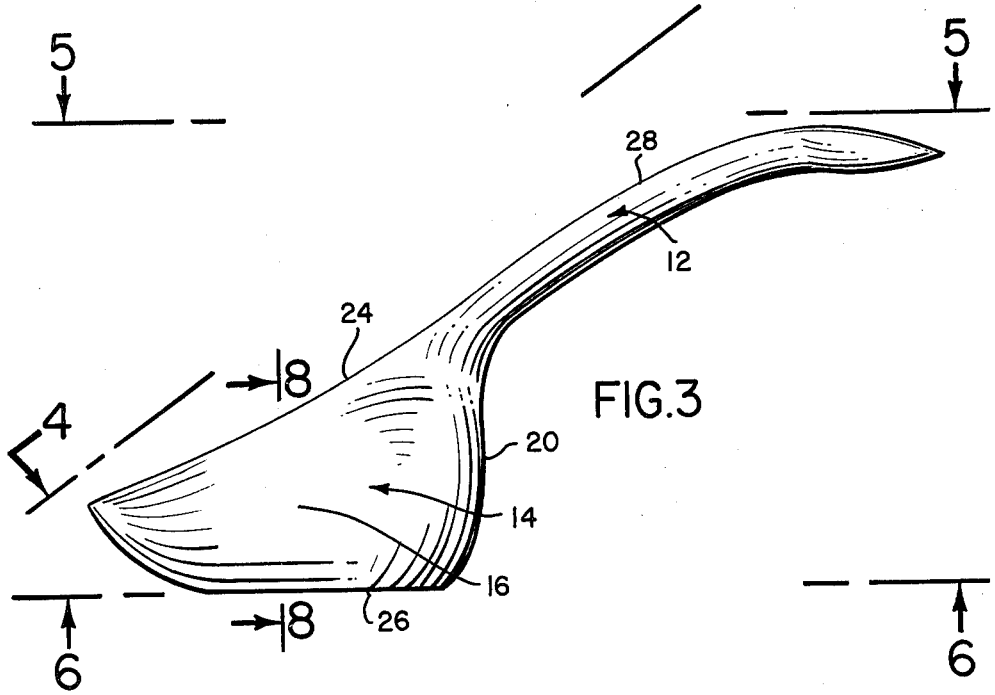
FIG. 3 is a side elevational view thereof.

As is readily apparent from FIG. 1, the size and shape of the spoon bowl 14 readily virtually, completely cradles a typical hen egg so that such is securely retained within the bowl 14. To achieve this end the bowl 14 is of a bifurcated construction having opposed side walls 16 which terminate in rounded frontal edges 18 that are inwardly directed, one toward the other, and a substantially vertical back wall 20. Furthermore, note that the side and back walls 16, 20 are of an ovate construction (FIG. 8) and thus conform to the shape of the product to be retained. Likewise, due to the bifurcation, the bottom and front of the bowl remain open as is readily apparent from FIGS. 2, 4, 5, 6 and 7.

The back wall 20 of spoon bowl 14, as indicated, has a substantially vertical orientation which is of a dimension (x), FIG. 7. It is important that such be compared with the frontal edge 18 vertical dimension (y) which is substantially less. Preferably the noted relationship is maintained such that $y = (0.125 \text{ to } 0.750) \times$ and ideally at about $0.350 \times$. This combined with the fact that the upper edges 24 of walls 16 and 20 is substantially uniformly sloped between these front and back wall areas to produce a bowl varying depth, typical of a scoop or scoop shovel and thus provides the substantial retentive qualities desired.

Also attention is directed to the lower edge 26 of bowl 14 which is substantially planar in nature. This, in addition to generating the bottom opening in the bowl provides a broad base of support so that the spoon 10 and retained egg can together be placed, for example, on a counter top with assurance that such will remain upright in the intended retentive relationship. Furthermore, the bifurcated and concave wall configuration and said back wall include bottom edges (26) in the same plane with an imaginary, forward, geometrical extension of such plane making an acute angle with the imaginary, forward, geometrical extension of said upper edges (24) thereby forming the slope of such edges.

The handle member 12 is concavely shaped (FIGS. 7, 9, 10 and 11) so that any fluid that may find its way therealong will drain back into the spoon bowl 14 and out the bottom opening. The general plane of the handle also follows that of bowl edge 24 and thus produces a grippable extension that is well above the bowl 14. Likewise, edge 24 smoothly extends therewith to form the top edges 28 of the concave handle member.

It should be apparent therefore that because of the bowl part dimensional relationships and the further elevation of the handle member thereabove, that this spoon or scoop is especially well adapted to retrieve eggs from a fluid medium, for example, as is contained in a sauce pan. The user without other assistants can readily and easily position the spoon bowl 14 about the boiled egg in net like fashion and remove same from the pan and medium without the need to be an expert in balancing routines. The same can be said for the emersion of eggs into a similar environment.

Accordingly, the device as shown although variable in certain respects provides a spoon construction having utilitarian advantages, as described, over those of the prior art.

I claim:

1. An egg spoon suitable for the introduction of eggs into or the removal of eggs from a body of fluid comprising a handle member integrally formed as a part of a spoon bowl and protruding therefrom, said bowl including a bifurcated and concave wall configuration having frontal edges and an interconnected back wall which is of a substantially vertical disposition and wherein said bifurcated and concave wall configuration and said back wall include bottom edges positioned in the same plane, and wherein said bifurcated and concave wall configuration includes upper edges, said upper edges sloping in an upward direction from said frontal edges toward said back wall in such fashion that the imaginary, forward, geometrical extension of said plane makes an acute angle with the imaginary, forward, geometrical extension of said upper edges thereby forming the slope of such upper edges.

2. An egg spoon according to claim 1 wherein said frontal edges which are inwardly directed one toward the other and have a vertical extent of between about 0.125 and 0.750 of that of said back wall.

3. An egg spoon according to claim 1 wherein said upper edges extend to and form the upper surface of the handle member.

* * * * *